(12) United States Patent
Steinbrecher

(10) Patent No.: US 7,311,496 B1
(45) Date of Patent: Dec. 25, 2007

(54) APPARATUS AND METHOD FOR GENERATING ELECTRIC ENERGY IN A FLUID ENVIRONMENT

(75) Inventor: Donald H Steinbrecher, Brookline, MA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 452 days.

(21) Appl. No.: 11/081,895

(22) Filed: Mar. 14, 2005

(51) Int. Cl.
*F03B 3/00* (2006.01)
*F03D 5/06* (2006.01)

(52) U.S. Cl. ............................ 416/1; 416/79; 416/131; 415/906

(58) Field of Classification Search ................... 416/79, 416/131; 415/3.1, 8, 26, 906
See application file for complete search history.

(56) References Cited

U.S. PATENT DOCUMENTS

| | | |
|---|---|---|
| 4,306,157 A | 12/1981 | Wracsaricht |
| 4,347,036 A | 8/1982 | Arnold |
| 4,915,584 A | 4/1990 | Kashubara |
| 5,009,571 A | 4/1991 | Smith |
| 5,808,369 A | 9/1998 | Whelan |
| 6,273,680 B1 * | 8/2001 | Arnold ........................ 416/1 |
| 6,323,563 B1 | 11/2001 | Kallenberg, Jr. |

\* cited by examiner

*Primary Examiner*—Richard A. Edgar
(74) *Attorney, Agent, or Firm*—James M. Kasischke; Michael P. Stanley; Jean-Paul A. Nasser

(57) ABSTRACT

Apparatus for generating electrical energy in a fluid environment, the apparatus including a wing member for disposition in the fluid and pivotally movable about an axis in response to flow of the fluid thereabout, connector rods each pivotally mounted at a first end thereof on the wing on opposite sides of the axis, a crank member attached to a second end of each of the connector rods and rotatable about a pivot axis by movement of the attached connector rod, a housing supporting the wing member, a gear system disposed in the housing, an axle interconnecting each of the crank members and the gear system, and an electrical generator disposed in the housing and driven by the gear system.

11 Claims, 6 Drawing Sheets

APPARATUS AND METHOD FOR GENERATING ELECTRIC ENERGY IN A FLUID ENVIRONMENT

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The invention relates to the generation of electrical energy, and is directed more particularly to an apparatus and method for generating electric energy in a fluid environment, such as in shore and harbor areas, rivers, ocean bays and inlets, and ocean off-shore.

(2) Description of the Prior Art

Undersea communications networks and sensors deployed by the United States Navy require a source of electrical power. Typically, such power is provided by shore or ship based generators and/or batteries housed in network nodes and in sensors.

There is a need for the generation of the electrical power needs of underwater sensors, instruments, and communications nodes locally. Local electrical power is needed to support sensor functions, recharge power supplies of garaged unmanned underwater vehicles, acoustic communication links, and for deploying and retrieving sea-surface buoys which, in turn, establish satellite communication links, and to provide local computer power for data fusion and other system functions.

SUMMARY OF THE INVENTION

An object of the invention is, therefore, to provide an apparatus for generating electric energy in an under-sea environment, the apparatus requiring no outside source of fuel or power.

A further object of the invention is to provide a method for generating electric energy in an under-water environment by means of a self-powered apparatus.

With the above and other objects in view, as will hereinafter appear, a feature of the invention is the provision of an apparatus for generating electrical energy in a fluid environment. The apparatus includes a wing member for disposition in the fluid and pivotally movable about an axis in response to flow of the fluid thereabout. Connecting rods are each pivotally mounted at a first end thereof on the wing on opposite sides of the axis, a crank member is attached to a second end of each of the connector rods and is rotatable about a crank member pivot axis by movement of the attached connector rod. A housing supports the wing member, a gear system disposed in the housing, and an axle interconnects each of the crank members and the gear system. An electrical generator is disposed in the housing and driven by the gear system.

In accordance with a further feature of the invention, there is provided an apparatus for generating electrical energy in a fluid environment. The apparatus includes a wing member for disposition in the fluid and having a hydrodynamic axis about which the wing member is movable in pivotal fashion in response to flow of the fluid thereabout, two connector rods, each pivotally mounted at a first end thereof on the wing at respective points removed in opposite directions from the hydrodynamic axis, a first crank member to which a second end of a first of the connector rods is pivotally fixed at a selected distance from a pivot axis of the first crank member, a second crank member to which a second end of a second of the connector rods is pivotally fixed at the selected distance from a pivot axis of the second crank member, a housing for supporting the wing member, and a gear system disposed in the housing. Each of the crank members is fixed to an axle extending into the housing and connected to the gear system, and an electrical generator is disposed in the housing and driven by the gear system to produce electrical energy. Movement of the wing about the hydrodynamic axis thereof causes movement of the connector rods which causes movement of the crank members fixed upon the axles, the gear system being actuated by the rotation of the axles to drive the electrical generator.

In accordance with a still further feature of the invention there is provided a method for generating electrical energy in a fluid environment. The method includes the steps of providing an assembly comprising an apparatus for generating electrical energy in a fluid environment. The apparatus includes a wing member for disposition in the fluid and pivotally movable about a hydrodynamic center axis in response to flow of the fluid thereabout, connector rods each pivotally mounted at a first end thereof on the wing on opposite sides of the hydrodynamic center axis, a crank member attached to a second end of each of the connector rods and rotatable about a crank member pivot axis by movement of the attached connecting rod, a housing supporting the wing member, a gear system disposed in the housing, an axle interconnecting each of the crank members and the gear system, an electrical generator disposed in the housing and driven by the gear system, and a shell disposed around the crank member, the housing, and portions of the connector rods and axles. The method includes the further steps of placing the shell in the fluid with the wing held by the first ends of the connecting rods at a disposition in the fluid spaced from the shell, the wing being free to move pivotally about the wing hydrodynamic center axis in response to flow of the fluid, and providing an output line from the generator to a selected electricity consumer.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
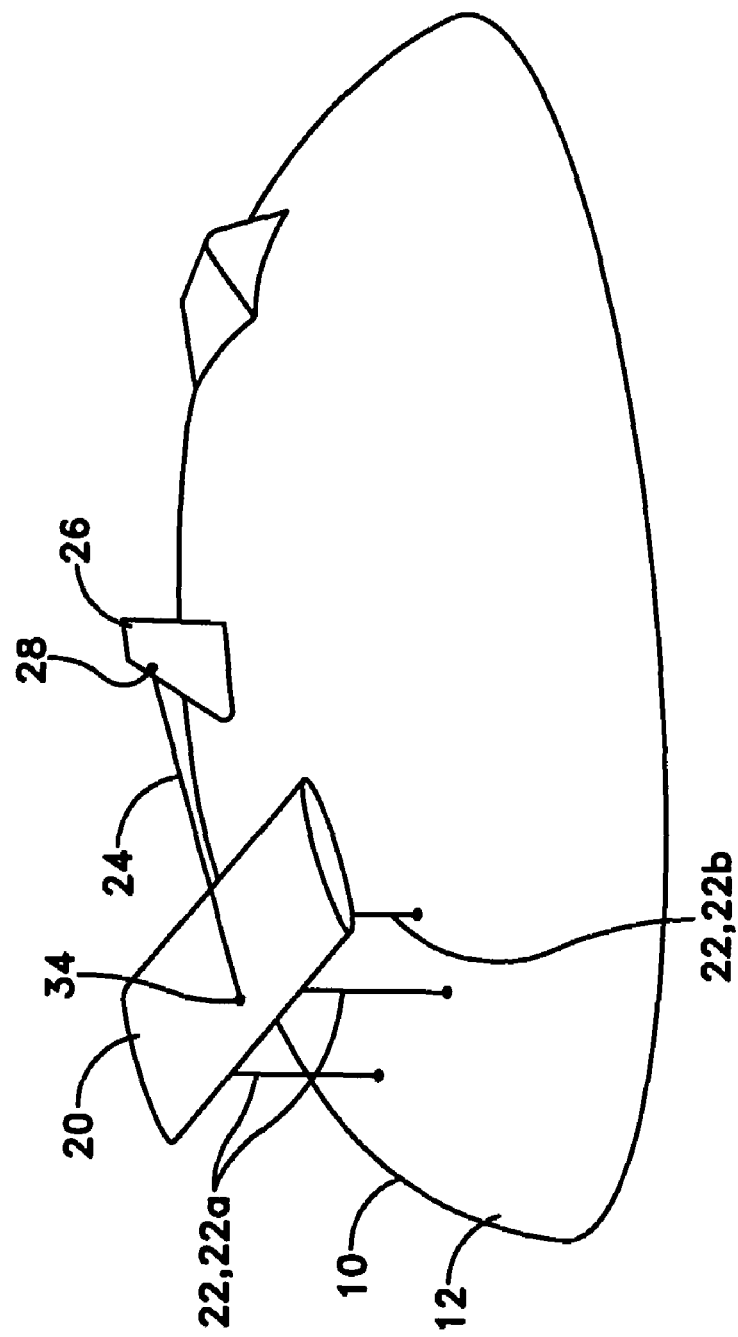
FIG. 1 is a perspective view of one form of an apparatus for generating electrical energy in a fluid environment, illustrative of an embodiment of the invention.

Referring to FIG. 1, it will be seen that an illustrative apparatus includes a shell 10 having a generally domed carapace portion 12, shaped similarly to the carapace of a sea turtle. The shell 10 further includes a plastron, or bottom, portion (not shown), shaped similarly to the plastron of a sea turtle.

A wing 20 is mounted at a location spaced from the carapace portion 12 of the shell 10. The wing 20 is supported by a forwardly disposed pair of connector rods, each rod of the pair being designated herein as 22, 22a. (This compound designation is sometimes employed herein to enable making collective reference to structural elements as well as more specific reference positional species of the structure elements.) Wing 20 is further supported by a rearwardly disposed pair of connector rods, each rod of the pair being designated 22, 22b. Note that only one rod of the pair of rearwardly disposed pair of rods is exposed in FIG. 1. These rods 22 are pivotally affixed to the wing and extending from the surface of the wing 20 which faces the shell 10. The wing is further supported by a trailing arm 24 pivotally fixed to the wing 20 and, at an end remote from the wing, pivotally fixed at a pivot point 28 (FIG. 4) to a post or fin 26 upstanding from the shell and pivotal about point 38 (FIG. 4).

As shown in FIG. 1, the shell 10 is adapted to rest on a sea bed, or the like. In placement of the apparatus, the apparatus may be released at the water surface and, utilizing the wing 20, glide through the water until coming to rest on the bed of the body of water.

Figure 2:
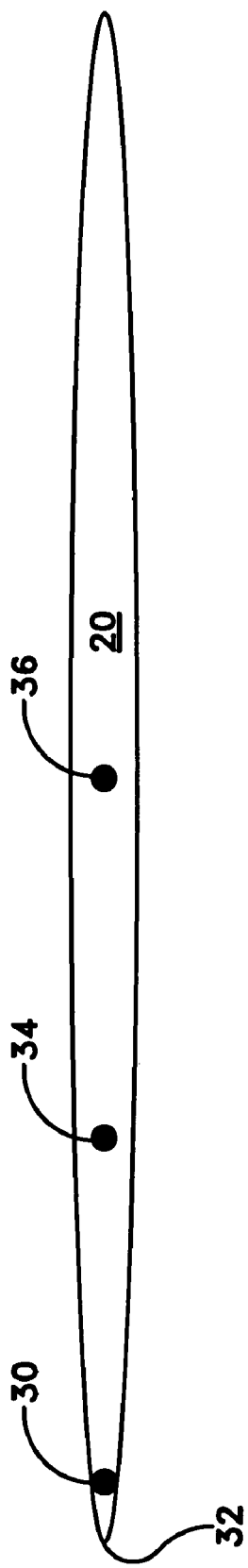
FIG. 2 is a sectional view taken through a wing portion of the apparatus of FIG. 1, in a fore-and-aft direction.

As shown in FIG. 2, the wing 20 is provided with a forward pivot axis 30 extending wing-tip to wing-tip proximate the forward edge 32 of the wing. Disposed aft of the forward pivot axis 30 by about one-fourth of the fore-and-aft dimension of the wing is a hydrodynamic-center axis 34 of the wing, extending parallel to the forward pivot axis 30. A forward end of the trailing arm 24 (FIGS. 1 and 4) is pivotally connected to the wing at the center of the hydrodynamic axis, i.e. the center of the tip-to-tip wing length. Disposed aft of the hydrodynamic axis 34 by about one-fourth of the fore-and-aft dimension of the wing is an after pivot axis 36, extending parallel to the forward pivot axis 30 and hydrodynamic axis 34. The pivot axis 36 is, therefore, at about the fore-and-aft mid-point of the wing.

Figure 3A:
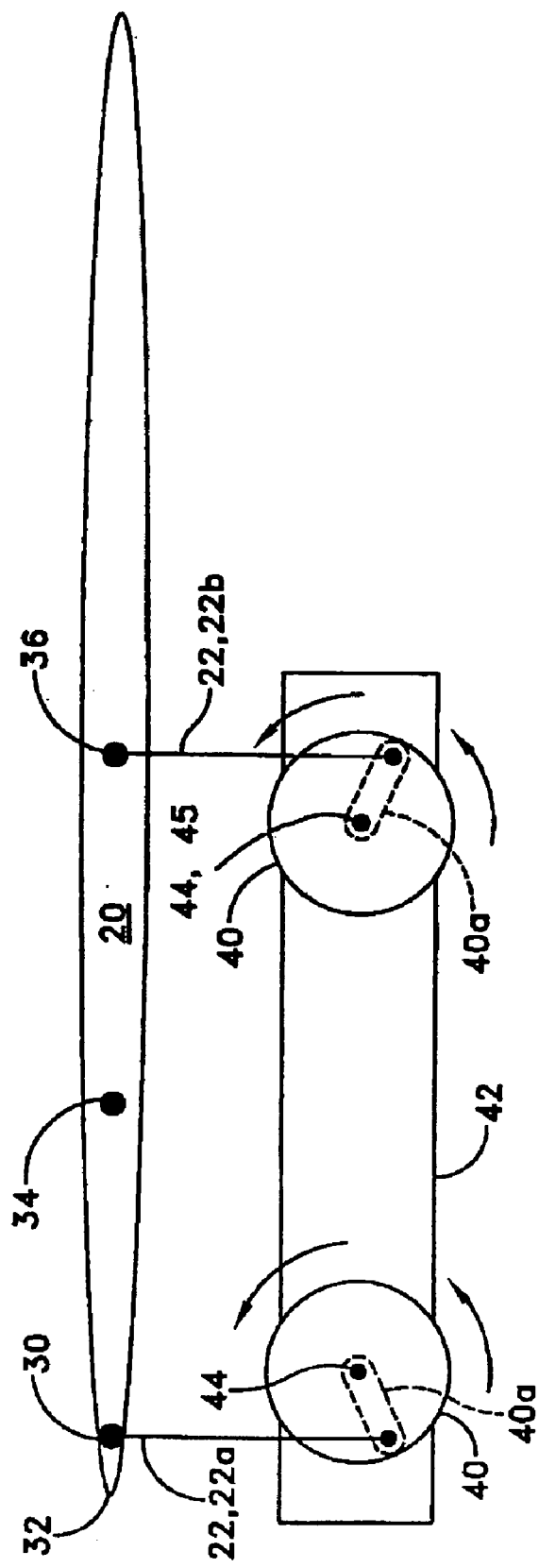
FIG. 3A is a diagrammatic view of the wing portion of FIG. 2 in combination with connector rods, crank members, and a housing portion of the apparatus of FIG. 1, single large dot 44, 45 representing both an axle and a pivot axis.
Figure 4:
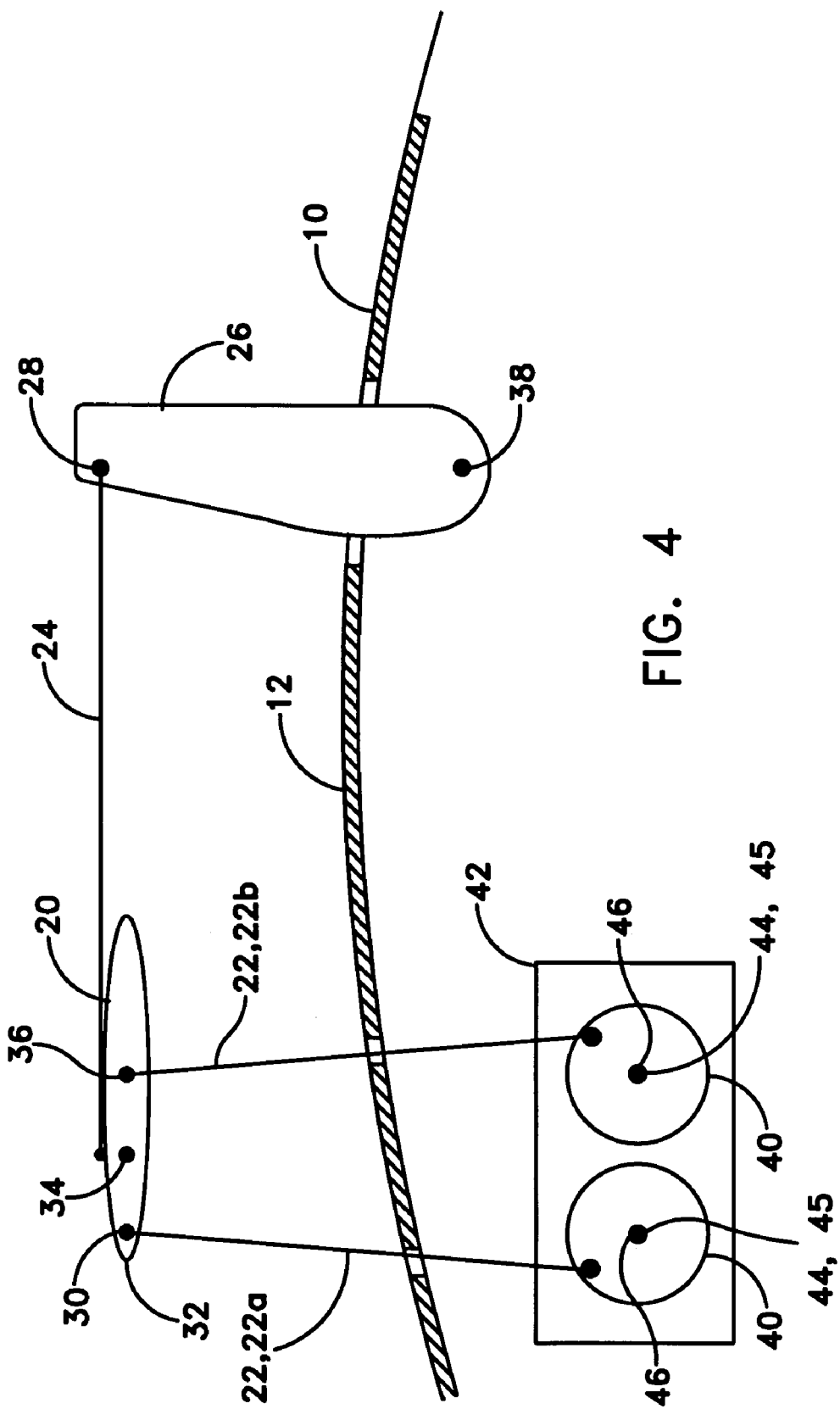
FIG. 4 is a diagrammatic illustration of components of FIG. 3A in combination with a trailing arm, single large dots 44, 45 and 46 conjointly representing an axle, pivot axis and a sealed bearing.
Figure 5:
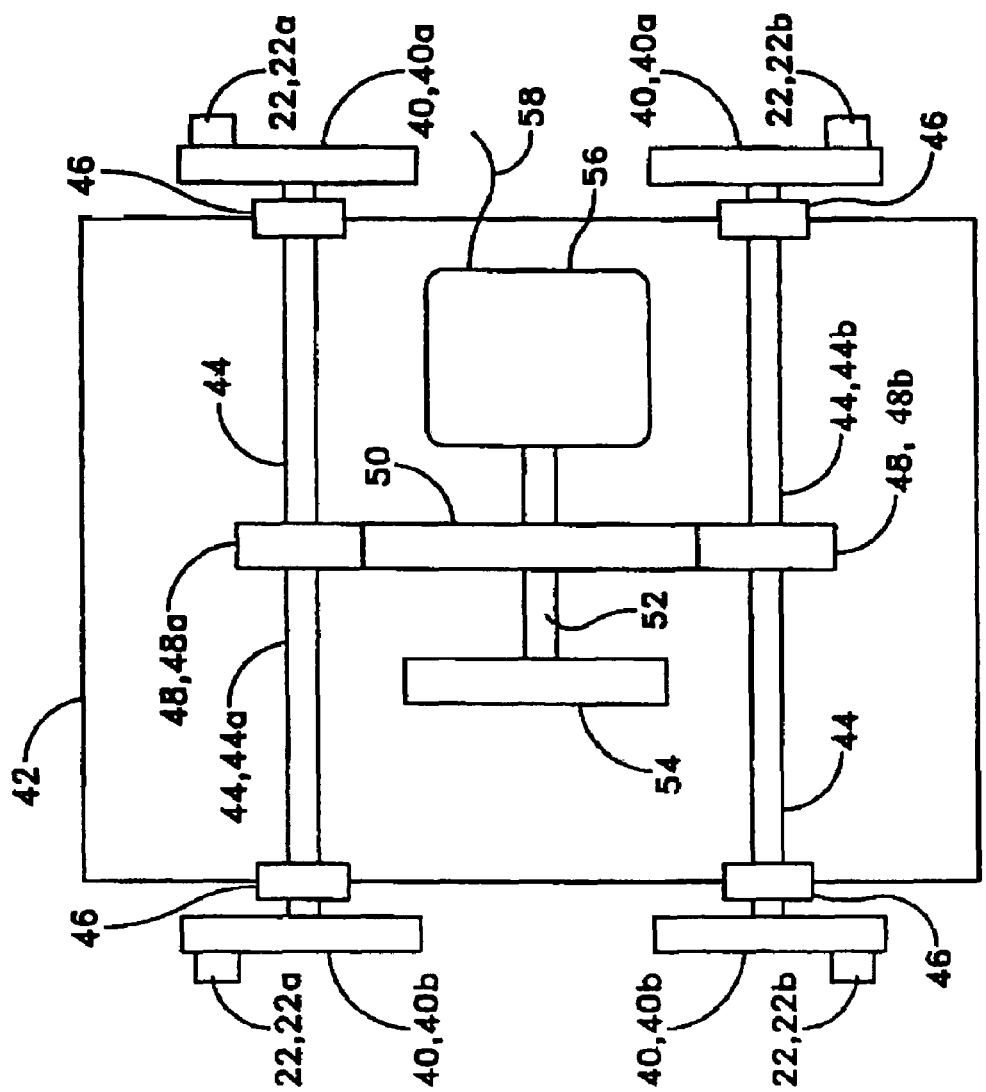
FIG. 5 is a diagrammatic illustration of the crank members and the contents of the housing portion of the apparatus of FIGS. 3A, 6 and 4.

Referring to FIGS. 3A and 4, it will be seen that the connector rods 22 are pivotally connected to crank members 40, illustrated in FIGS. 3A-6 as crank wheels. The crank wheels are of equal diameter and the connector rods 22 are attached to the crank wheels at respective points on the wheels disposed equal distance from the centers of the wheels.

Alternatively, the crank members 40 may be crank rods 40a, shown in phantom in FIG. 3A. The crank rods 40a are of equal length. The connector rods 22 are attached to the crank rods 40a at respective points of the crank rods 40a disposed at equal distances from the pivot axes 45 of the crank rods 40a. (Note that in FIGS. 5, 3A and 6 axle element 44, pivot axis 45, and sealed bearing 46 may be represented by a single large dot.)

Referring now to FIGS. 1 and 3A-6, a water-tight housing 42 is mounted within the shell 10 (FIG. 4). The crank members 40 are each mounted on an end of an axle 44. The axles 44 are mounted in water-tight bearings 46 (FIG. 5) and extend into the interior of the housing 42. The axles 44 are each connected to a reduction gear 48. (Note that in FIG. 4 axel 44, pivot axis 45, and sealed bearings 46 are represented by a single large dot.)

In the embodiment shown in the drawings, four of the connector rods 22 are connected to the wing 20, two 22a at the forward pivot axis 30 and two 22b at the after pivot axis 36. The connector rods 22 are each connected to a crank member 40 which, in turn, is mounted on an axle 44 extending through a sealed bearing 46 and into the housing 42.

The two starboard connector rods 22 are each connected to a starboard crank member 40a (FIG. 5), the two starboard crank members being mounted on the starboard side of the housing 42. Similarly, the two port connector rods 22 are each connected to a port crank member 40b, the two port crank members 40b being mounted on the port side of the housing 42.

The forwardmost pair of crank members 40 are each mounted on a forwardmost axle 44a and the after pair of crank members are each mounted on an after axle 44b. The forwardmost axle 44a is further affixed to a forwardmost reduction gear 48a, while the after axle 44b is affixed to an after reduction gear 48b. The reduction gears 48a, 48b are each engaged with an idler gear 50. Fixed in the hub of the idler gear is an axle 52 having a flywheel 54 fixed thereon and extending into an electrical generator 56.

The apparatus is intended to supply power to a consumer outside of the apparatus. Output line 58 is provided for connection to such consumer, which as noted hereinabove, can be a sensor, a communication device, an underwater vehicle, and the like.

Figure 6:
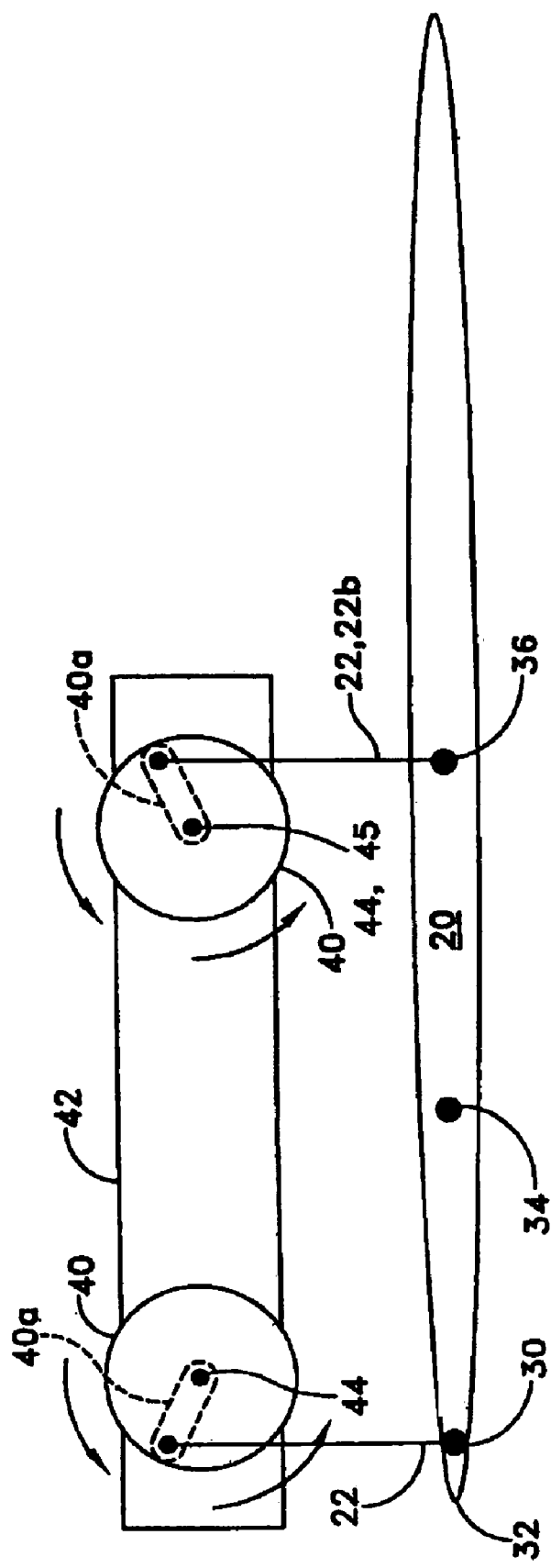
FIG. 6 is similar to FIG. 3A, but showing an alternative disposition of the elements of the apparatus shown in FIG. 3A, single large dot 44, 45 representing both an axle and a pivot axis.

While it is expected that the apparatus will, in most instances, be deployed to rest on a seabed, or the like, it is contemplated that the apparatus will be used on the hulls of water-borne vessels such as barges, and the like. In such instances, the apparatus will be fixed to the hull of the vessel with the wing 20 extending downwardly, or outwardly, from the hull of the vessel, as depicted in FIG. 6.

In use, the apparatus is typically placed upon a seabed or released at or near the water surface and allowed to glide to the seabed. The apparatus will typically align itself such that the wing forward edge 32 is normal to the fluid flow direction. The fluid flow exerts on the wing 20 a lifting force, which is normal to the direction of fluid flow, a drag force which is exerted on the wing 20 in the direction of fluid flow, and a pitching moment, which acts at the hydrodynamic axis 34 of the wing 20 and tends to increase the angle of incidence of the wing 20. The pitching moment is independent of the lifting force.

The connector rods 22 allow the wing 20 to move in a vertical swimming motion induced by the lift force, while the trailing arm 24 steadies the wing 20 against horizontal motion that would otherwise be induced by the drag force.

The pivot points of the connector rods 22 on the wing 20 are symmetrically located forward and aft of the wing hydrodynamic axis 34. The trailing arm pivot point is located on the hydrodynamic axis 34. The after end of the trailing arm 24 is pivotally connected to the fin 26. The wing supporting connector rods 22 drive a transmission system 44, 48, 50, 52, 54 to cause the electrical generator 56 to rotate in response to the wing 20 swimming motion.

The wing 20 is free to pivot about the connector rods 22 and the trailing rigid arm 24, such that the angle of the wing 20 relative to the direction of fluid flow may oscillate in a smooth symmetrical fashion between a peak upward angle of attack that results in an upward-directed flow-induced force on the wing 20, a neutral high position that results in no flow-induced force on the wing 20, a peak downward angle of attack that results in a downward-directed flow-induced force on the wing 20, and a neutral low position that results in no flow-induced force on the wing 20. As the oscillation continues, the force caused by the fluid flow varies in a nearly sinusoidal manner between a peak upward force and a peak downward force. The symmetry of the structure insures that the magnitude of the peak upward force is substantially equal to the magnitude of the peak downward force. The magnitude of the total flow-induced force depends upon the fluid flow velocity, the area of the wing 20, and the angle of attack of the wing 20 relative to the direction of fluid flow.

An alternative system (not shown) includes a plurality of wings, each connected to another by a plurality of connector rods and each held in fore-and-aft place by a pivoting rigid trailing arm, so that all wings are free to move in parallel with each other, and flow-induced forces on the wings result in appropriate forces on the crank members. The flow-induced total force is proportional to the total area of the plurality of wings.

The above-described apparatus is adapted for use in seawater where corrosion and organic growth are major concerns. The apparatus permits most of the mechanical parts to be disposed out of the water environment. Six pivot points are located in the water, four to support the wing 20 by means of the connector rods 22 and two to allow the rigid trailing arm 24, which holds the wing 20 against the force of the water current, to move through a small angle to follow the up and down motion of the wing 20. If desired, these six pivot points can be sealed (not shown) and permanently lubricated for close to friction-free operation.

The wing 20 may also be used for lift for navigating the apparatus from one site to another. After reaching an operational site, the wing 20 is used to generate electrical power from local tidal currents.

Using the above-described apparatus, the invention provides a method for converting the undulating motion of a wing suspended in a moving fluid into circular motion of a flywheel which is used to drive an electrical generator. The undulating motion is similar to the action of a whale or other sea creature with a horizontal tail fin.

It will be understood that many additional changes in the details, materials, steps and arrangement of parts, which have been herein described and illustrated in order to explain the nature of the invention, may be made by those skilled in the art within the principles and scope of the invention as expressed in the appended claims. For example, while the apparatus is immediately intended for use of the type set forth hereinabove, it is recognized that the apparatus described herein can be upscaled to provide power similar to current off-shore wind mills, but with no danger to birds, which is a problem with off-shore "wind farms".

What is claimed is:

1. An apparatus for generating electrical energy in a fluid environment, the apparatus comprising:

a wing member for disposition in the fluid and pivotally movable about a hydrodynamic center axis in response to flow of the fluid thereabout;

connector rods each pivotally mounted at a first end thereof on said wing on opposite sides of the hydrodynamic center axis;

a crank member attached to a second end of each of said connector rods and rotatable by the attached connector rod about a crank member axis;

a housing supporting said wing member;

a gear system disposed in said housing;

an axle interconnecting each of said crank members and said gear system; and an electrical generator disposed in said housing and driven by said gear system;

wherein the hydrodynamic center axis about which said wing is pivotally movable is aft of a leading edge of said wing by about ¼ of the wing fore-and-aft dimension and extends substantially from wing tip to wing tip.

2. An apparatus for generating electrical energy in a fluid environment, the apparatus comprising:

a wing member for disposition in the fluid and pivotally movable about a hydrodynamic center axis in response to flow of the fluid thereabout;

connector rods each pivotally mounted at a first end thereof on said wing on opposite sides of the hydrodynamic center axis;

a crank member attached to a second end of each of said connector rods and rotatable by the attached connector rod about a crank member axis;

a housing supporting said wing member;

a gear system disposed in said housing;

an axle interconnecting each of said crank members and said gear system;

an electrical generator disposed in said housing and driven by said gear system; and a shell disposed around said crank members, said axles, said housing, and portions of said connector rods.

3. The apparatus in accordance with claim 2 and further comprising a trailing arm pivotally connected at a first end thereof to said wing and pivotally connected at a second end thereof to a fin extending from said shell.

4. The apparatus in accordance with claim 2 wherein said axles are disposed in sealed bearings mounted in walls of said housing.

5. An apparatus for generating electrical energy in a fluid environment, the apparatus comprising:

a wing member for disposition in the fluid and pivotally movable about a hydrodynamic center axis in response to flow of the fluid thereabout;

connector rods each pivotally mounted at a first end thereof on said wing on opposite sides of the hydrodynamic center axis;

a crank member attached to a second end of each of said connector rods and rotatable by the attached connector rod about a crank member axis;

a housing supporting said wing member;

a gear system disposed in said housing;

an axle interconnecting each of said crank members and said gear system;

an electrical generator disposed in said housing and driven by said gear system;

a shell disposed around said crank members, said axles, said housing, and portions of said connector rods; and a trailing arm pivotally connected at a first end thereof to said wing and pivotally connected at a second end thereof to a fin extending from said shell;

wherein said trailing arm first end is connected to said wing at said hydrodynamic center axis of said wing.

6. The apparatus in accordance with claim 5 wherein said connector rods and said trailing arm are rigid.

7. An apparatus for generating electrical energy in a fluid environment, the apparatus comprising:

a wing member for disposition in the fluid and pivotally movable about a hydrodynamic center axis in response to flow of the fluid thereabout;

connector rods each pivotally mounted at a first end thereof on said wing on opposite sides of the hydrodynamic center axis;

a crank member attached to a second end of each of said connector rods and rotatable by the attached connector rod about a crank member axis;

a housing supporting said wing member;

a gear system disposed in said housing;

an axle interconnecting each of said crank members and said gear system; and an electrical generator disposed in said housing and driven by said gear system;

wherein said gear system comprises a reduction gear mounted on each of said axles, and an idle gear in communication with said reduction gears and mounted on a drive axle connected to said generator.

8. The apparatus in accordance with claim 7 and further comprising a flywheel mounted on said drive axle.

9. An apparatus for generating electrical energy in a fluid environment, the apparatus comprising:

a wing member for disposition in the fluid and having a hydrodynamic axis about which said wing member is movable in pivotal fashion in response to flow of the fluid thereabout;

two connector rods, each pivotally mounted at a first end thereof on said wing at respective points removed in opposite directions from the hydrodynamic axis;

a first crank member to which a second end of a first of said connector rods is pivotally fixed at a selected distance from a pivot axes of said first crank member;

a second crank member to which a second end of a second of said connector rods is pivotally fixed at the selected distance from a pivot axis of said second crank member;

a housing for supporting said wing member;

a gear system disposed in said housing;

each of said crank members being fixed to an axle extending into said housing and connected to said gear system;

an electrical generator disposed in said housing and driven by said gear system to produce electrical energy; and wherein movement of said wing about the hydrodynamic axis thereof causes movement of said connector rods which causes rotation of said crank members about the respective pivot axes thereof, said gear system being actuated by the rotation of said axes to drive said electrical generator;

wherein said first ends of said connector rods are mounted on said wing at points which are equally removed in opposite directions from the hydrodynamic axis;

wherein a forward-most of the two connector rods is mounted on said wing proximate a leading edge of said wing, and an after-most of the two connector rods is mounted proximate a fore-and-aft mid-point of said wing.

10. A method for generating electrical energy in a fluid environment, the method comprising the steps of:

providing an apparatus for generating electrical energy in a fluid environment, the apparatus comprising:

a wing member for disposition in the fluid and pivotally movable about a wing tip to wing tip axis;

connector rods each pivotally mounted at a first end thereof on said wing on opposite sides of the axis;

a crank member attached to a second end of each of said connector rods and rotatable by the attached connector rod about a crank member axis;

a housing supporting said wing member;

a gear system disposed in said housing;

an axle interconnecting each of said crank members and said gear system;

an electrical generator disposed in said housing and driven by said gear system; and a shell disposed around the crank members, the housing, the axles and portions of the connector rods;

placing the shell in the fluid with the wing held by the first ends of the connector rods at a disposition in the fluid spaced from the shell, the wing being free to move pivotally about the wing axis in response to flow of the fluid thereabout; and providing an output line from the generator to a selected electricity consumer.

11. The method in accordance with claim 10 wherein the step of placing the shell in the fluid comprises placing the shell in a body of water by a selected one of (i) placing the shell on a bottom of the body of water with the wing extending upwardly from the shell, and (ii) placing the shell on a hull of a flotation apparatus with the wing extending outwardly from the shell and the hull.

\* \* \* \* \*